United States Patent [19]

Smith

[11] 4,444,625
[45] Apr. 24, 1984

[54] METHOD AND APPARATUS FOR RECLAIMING DRYCLEANING FLUID

[75] Inventor: Robert G. Smith, Chesterfield, Mo.
[73] Assignee: Kleen-Rite, Inc., St. Louis, Mo.
[21] Appl. No.: 485,724
[22] Filed: Apr. 18, 1983

Related U.S. Application Data

[60] Continuation of Ser. No. 277,199, Jun. 25, 1981, abandoned, which is a division of Ser. No. 170,277, Jul. 18, 1980, Pat. No. 4,283,279.

[51] Int. Cl.³ .......................... B01D 3/38; B01D 3/40
[52] U.S. Cl. .......................................... 203/95; 134/12; 8/142; 8/149.3; 202/170; 165/74; 165/110; 210/774; 210/798; 210/806
[58] Field of Search ............... 210/774, 775, 794, 798, 210/797, 121, 123, 538, 175, 187, 540, 806, 322, 332, 409; 165/74, 110; 8/142, 149.3; 202/234, 170; 203/95, 96; 134/12

[56] References Cited

U.S. PATENT DOCUMENTS

| | | | |
|---|---|---|---|
| 217,442 | 7/1879 | Belcher | 210/798 |
| 880,742 | 3/1908 | Kelly | 210/798 |
| 1,045,811 | 12/1912 | Buhring | 210/540 |
| 1,770,236 | 7/1930 | Jennings | 210/187 |
| 2,224,624 | 12/1940 | Adams | 210/175 |
| 2,729,961 | 1/1956 | Shields | 210/540 |
| 2,979,375 | 4/1961 | Kircher | 210/798 |
| 3,104,936 | 9/1963 | Fuhring | 8/142 |
| 3,214,026 | 10/1965 | Behrems | 210/540 |
| 3,676,307 | 7/1972 | Black | 210/175 |
| 4,076,500 | 2/1978 | Rearick | 8/142 |

FOREIGN PATENT DOCUMENTS 136084 1/1950 Australia .......................... 210/798

Primary Examiner—Ernest G. Therkorn
Attorney, Agent, or Firm—Richard J. Sher

[57] ABSTRACT

Drycleaning fluid is recovered from spent drycleaning fluid filter elements by passing steam through the elements to form a steam/drycleaning-fluid vapor mixture. The mixture is condensed into liquid state and the two constitutents are separated. The apparatus includes a condensing chamber and a separating chamber with a novel valve for ensuring that drycleaning-fluid vapors do not escape into the work area.

2 Claims, 4 Drawing Figures

METHOD AND APPARATUS FOR RECLAIMING DRYCLEANING FLUID

This is a continuation of application Ser. No. 277,199 filed June 25, 1981 now abandoned, which application is a division of application Ser. No. 170,277 filed July 18, 1980, now U.S. Pat. No. 4,283,279, issued Aug. 11, 1981.

BACKGROUND AND SUMMARY OF THE INVENTION

It is well known in the drycleaning field to utilize a filtering system to clean and purify the drycleaning fluid during the drycleaning process. The filtering system includes one or a plurality of cylindrical filter tanks connected in parallel and containing a number of annular filter elements placed end-to-end therewithin. During the filter process, drycleaning fluid is pumped from the drycleaning machine to the outer periphery of the filter elements. The fluid then passes radially inwardly through the filter elements where the fluid is cleansed and purified. The fluid then passes out of the filter elements and filter tanks through a central passage. After a certain number of pounds of clothes are cleaned, the filter elements are considered spent; (i.e. the elements have lost their capacity to fully clean and purify the fluid), and the filter elements are removed from the tanks and fresh elements substituted in lieu thereof.

Even though prior to the removal of the spent elements from the filter tanks, the tanks are drained of cleaning fluid, there remains a great deal of residual drycleaning fluid trapped in the spent elements. Previous to the present invention, this residual fluid was disposed of along with the spent element. With rising prices of drycleaning fluid, problems of chemical disposal and increasing concerns regarding the escape and inhalation of drycleaning fluid fumes, it has become more important to reclaim or recover as much of the residual drycleaning fluid which remains in the spent elements.

According to the present invention, before removing spent filter cartridges from the filter tanks, steam is introduced into the tanks and is caused to pass through the cartridges. The steam causes residual cleaning fluid to become dislodged from the cartridge material and to vaporize to form a steam/cleaning-fluid vapor mixture. This vapor mixture is introduced into a novel drycleaning fluid reclaiming apparatus which includes a condensing chamber and a water/drycleaning-fluid separating chamber. Thus, after separation the drycleaning fluid which was heretofore discarded can be reused, and much of the drycleaning fluid vapors which were before present when the filtering tanks were opened by the operator will no longer present a health hazard to the operator or a pollution problem to the environment.

It is therefore one object of the invention to provide a method of reclaiming residual drycleaning fluid from spent filter elements prior to the removal of the elements from the filter tank.

It is another object of the invention to provide a novel apparatus for recovering crycleaning fluid from a mixture of drycleaning fluid vapor and water vapor without the escape of a substantial amount of drycleaning fluid vapor into the environment.

BRIEF DESCRIPTION OF THE DRAWINGS

These as well as other objects and advantages will become more apparent upon a reading of the description of a preferred embodiment of the invention in conjunction with the drawings wherein:

FIG. 3 is a top plan view of the condenser used in the reclaimer; and

DETAILED DESCRIPTION OF THE PREFERRED EMBODIMENT

Figure 1:
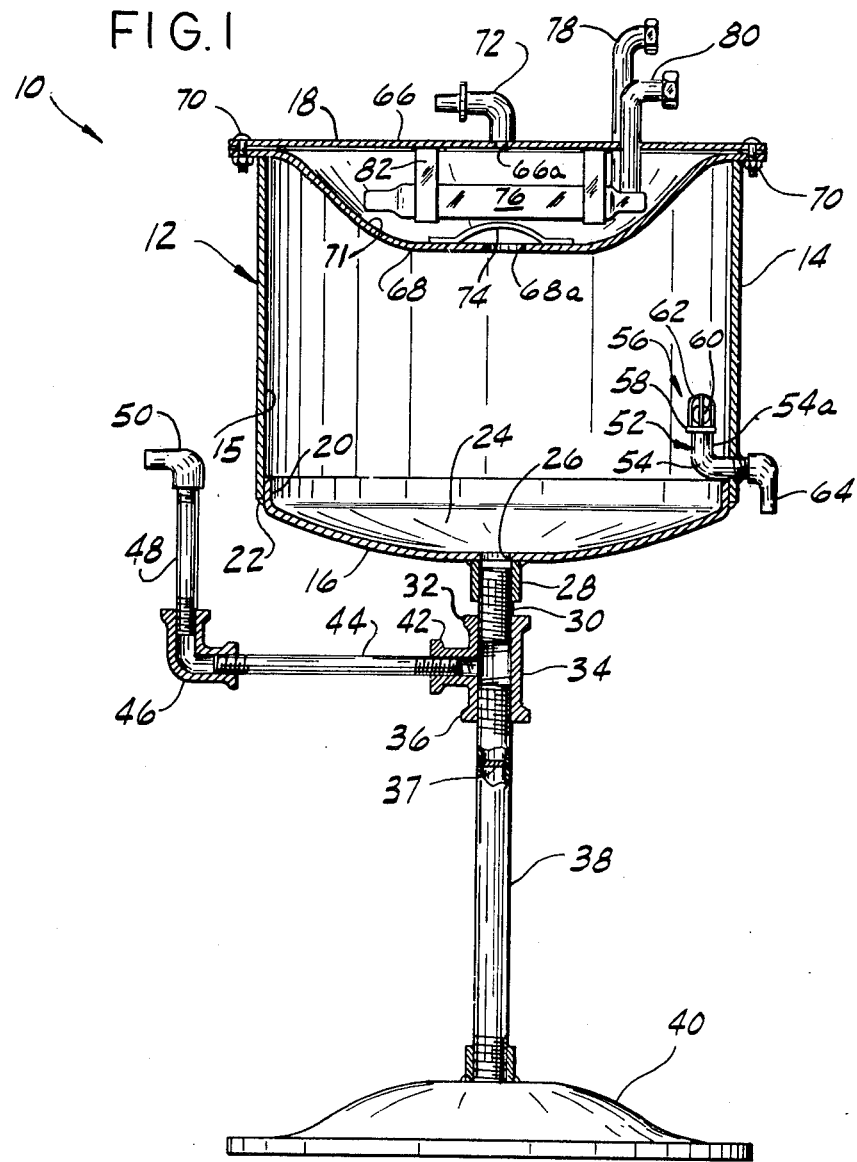
FIG. 1 is a vertical cross section of a drycleaning fluid reclaimer according to the present invention.
Figure 2:
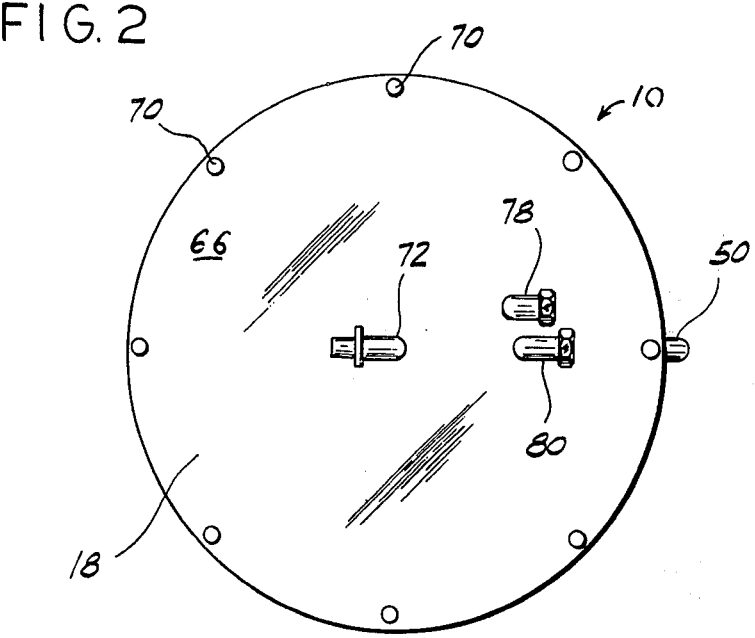
FIG. 2 is a top plan view of the reclaimer.

With reference to the drawings, and FIG. 1 in particular, there is shown a drycleaning fluid reclaimer, generally referred to by the numeral 10, constructed in accordance with the principles of the present invention.

Reclaimer 10 includes a closed container 12 constructed of an aluminum cylindrical side section 14, a generally circular aluminum bottom end section 16 and circular top end section 18. Bottom section 16 includes an annular upwardly extending lip 20 which fits tightly within cylindrical side section 14 and the two sections, 14 and 16, are permanently joined by a circular weld 22 at the extreme bottom edge of side section 14 to form a separation chamber 15.

Bottom section 16 is formed to present a concave inner surface 24 with a central fluid outlet port 26 at the lowest point thereof. An interior threaded pipe nipple 28 is welded to bottom section 16 and exterior threaded bushing 30 places outlet 26 in fluid communication with top portion 32 of tee member 34. Bottom portion 36 of tee member 34 is connected to support pipe 38 which is carried by platform stand 40. It is important to note that support pipe 38 is permanently plugged by disc 37 to prevent liquid from traveling therethrough. Side portion 42 of tee member 34 is connected to horizontally extending pipe 44 which in turn carries 90° elbow member 46. Elbow member 46 is connected to upwardly extending pipe 48 and at the upper end of pipe 48 is positioned a 90° elbow tapered hose connection member 50.

Located near the bottom of side section 14 of reclaimer 10 is a water outlet 52 including an elbow member 54 extending through side section 14 and having an upstanding portion 54a. At the top of upstanding portion 54a there is positioned a valve assembly 56. Valve assembly 56 includes an annular valve seat 58, a ball valve 60 and a cage structure 62 which retains ball valve 60 in vertical alignment with valve seat 58. Ball valve 60 is of a material which will float on water and thus open valve assembly 56 if the water level in chamber 15 rises above valve seat 58 but will close valve seat 58 if the water level descends below valve seat 58. A tapered hose connector 64 is connected to the outer end of elbow member 54.

It is noted that the position of hose connector 50 is caused to be above fluid outlet port 26 but below valve seat 58 for reasons which will become apparent hereinbelow.

Top end section 18 includes a flat upper plate 66 and a lower plate 68. Lower plate 68 is fabricated to extend downwardly to form a condensing chamber 71 between upper and lower plates 66 and 68 respectively. The outer edges of upper and lower plates 66 and 68, respectively, are secured together by circumferentially spaced bolts 70 and a sealing material is provided between the juncture of the two plates to prevent the escape of vapors therebetween. Both upper and lower plates 66 and 68, respectively, are provided with central orifices 66a and 68a, respectively. Welded to the top of upper plate 66 is a 90° hose connection member 72 which communicates a mixture of steam and drycleaning-fluid vapor through orifice 66a into condensing chamber 71. Positioned over orifice 68a is a baffle member 74 which prevents vapors entering condensing chamber 70 from passing directly through orifice 68a.

Located between orifices 66a and 68a in condensing chamber 71 is a condenser 76 having a tap-water inlet pipe 78 and a tap-water outlet pipe 80 passing through upper plate 66. Condenser 76 is of conventional design having a tap-water condensing coil passing through numerous heat conducting fins (See FIG. 3). Condenser 76 is suspended in place by a metal strap 82, attached to upper plate 66, as well as by inlet and outlet pipes 78 and 80 respectively.

Figure 4:
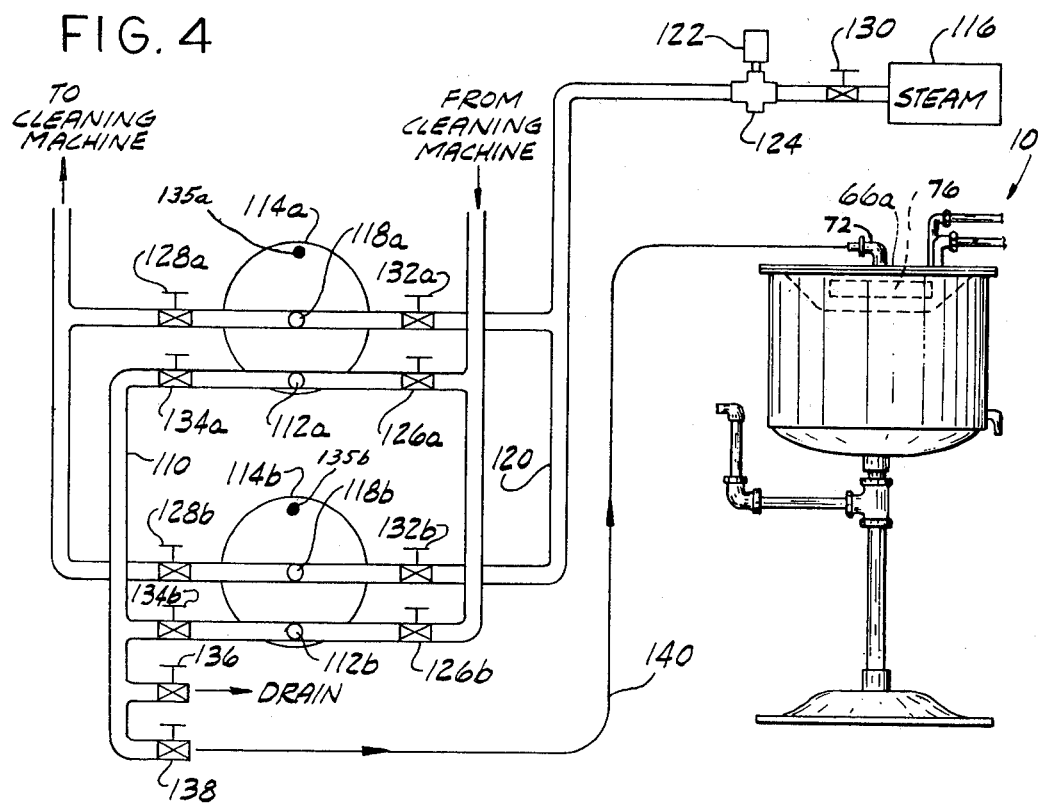
FIG. 4 is a schematic representation of a preferred drycleaning fluid reclaiming system.

As shown in FIG. 4, hose connection member 72 is connected to manifold 110 which communicates with the bottom or inlet side 112a and 112b of a conventional drycleaning fluid filter system schematically shown as upper and lower filter tanks 114a and 114b, respectively. A source of steam 116 is placed in fluid communication with the outlet openings 118a and 118b of upper and lower filter tanks 114a and 114b, respectively, by means of manifold 120. Included in manifold 120 is a pressure safety valve 122 and a heat sensitive safety valve 124.

During the conventional drycleaning fluid filtering operation, drycleaning fluid is continuously pumped from the drycleaning machine through inlets 112a and 112b into tanks 114a and 114b respectively, wherein are positioned drycleaning fluid filter elements (not shown). The fluid passes through the filter elements and then exits from tanks 114a and 114b through outlet openings 118a and 118b and back to the cleaning machine. After the filter elements are spent, hand valves 126a, 126b, 128a and 128b are closed and hand valves 134a, 134b and 136 are opened along with air inlets 135a, 135b permitting the cleaning fluid in tanks 114a and 114b to drain from the tanks. Subsequently, valve 136 is closed along with air inlets 135a and 135b, while valves 130, 132a, 132b and 138 are opened permitting steam to enter filter tanks 114a and 114b through manifold 120 and to pass through the filter elements in the direction opposite to the normal flow of drycleaning fluid. The steam, now laden with residual drycleaning fluid vapor, enters manifold 110 and passes into reclaimer 10 via line 140 through orifice 66a and impinges directly upon condensing coil 76. Now referring back to FIG. 1, condensing coil 76, being cooled by the circulation therewithin of relatively cool tap water, causes the vapor mixture to liquify within condensing chamber 70. Baffle member 74 acts to prevent vapor, which successfully passes through condensing coil 76 in gaseous state, from entering directly into separation chamber 15. Instead, the vapor will be rebounded back into condensing coil 76 until the majority of the vapors have been liquified. The liquid mixture of water and drycleaning fluid passes under baffle member 74 and drops through orifice 68a into the separation chamber 15.

Drycleaning fluid, being heavier than water will flow out of chamber 15 through pipes 30, 44 and 48 into a hose (not shown) connected between member 50 and a bucket or the drycleaning machine base tank (not shown). The level of drycleaning fluid in chamber 15 will never fall below the level of hose connector 50, thus no water or vapor can pass out of chamber 15 through outlet port 26. When the level of water resting on top of the drycleaning fluid in chamber 15 reaches valve assembly 56, ball valve 60 will float thereon allowing water to pass out of chamber 15 through elbow 54 to a drain (not shown). When the water level drops below valve seat 58, ball valve 60 will cover seat 58, and, therefore, no vapors present in chamber 15 will be allowed to escape through valve assembly 56 into the environment.

It can thus be seen that a method for reclaiming residual drycleaning fluid from spent filter cartridges and an apparatus therefore has been disclosed which satisfies the objects of the invention as hereinbefore stated. It is noted that the apparatus disclosed can also be used to similar advantage to reclaim drycleaning fluid from carbon absorbers utilized in the drycleaning field.

Inasmuch as numerous changes can be made to the preferred embodiment disclosed without departing from the spirit and scope of the invention, the scope of the invention should be determined solely by the following claims.

What is claimed is:

1. A method of reclaiming residual drycleaning fluid from spent filter elements positioned in filter tanks comprising the steps of:
    draining excess drycleaning fluid from the filter elements while the filter elements remain in the filter tanks;
    injecting steam through the filter elements in such tanks so as to vaporize residual drycleaning fluid to form a steam/drycleaning fluid mixture;
    removing said fluid mixture from such tanks to a condenser through a closed system;
    condensing said mixture in a condenser to form liquid water and liquid drycleaning fluid; and
    separating said water from said drycleaning fluid;
    said separating being performed without permitting drycleaning fluid vapors to escape into the environment.

2. The method as specified in claim 1 and further characterized by:
    said steam is injected through said filter elements in the direction opposite to the direction of flow of the drycleaning fluid through said filter elements during the normal drycleaning fluid filtering process.

* * * * *